United States Patent [19]
Kawayachi et al.

[11] Patent Number: 5,323,188
[45] Date of Patent: Jun. 21, 1994

[54] DPCM PREDICTIVE ENCODER

[75] Inventors: Noboru Kawayachi, Tokyo; Toru Shibuya, Miyagi, both of Japan

[73] Assignee: NEC Corporation, Tokyo, Japan

[21] Appl. No.: 946,640

[22] Filed: Sep. 18, 1992

[30] Foreign Application Priority Data

Sep. 18, 1991 [JP] Japan ................... 3-267171

[51] Int. Cl.$^5$ .................................. H04N 7/137
[52] U.S. Cl. ........................ 348/412; 375/27; 375/33
[58] Field of Search ............. 358/13, 136; 375/27, 375/33; H04N 7/137

[56] References Cited

U.S. PATENT DOCUMENTS 4,794,447 12/1988 Tsinberg .................. 358/14
4,833,535 5/1989 Ozeki ..................... 358/136
5,159,448 10/1992 Kojima .................... 375/33

Primary Examiner—Howard W. Britton
Attorney, Agent, or Firm—Sughrue, Mion, Zinn, Macpeak & Seas

[57] ABSTRACT

In a DPCM predictive encoder (or performing DPCM prediction by digitizing a NTSC color television signal with a rate three times of a color sub-carrier frequency, a two-frame predictor which outputs a differential signal over two frames is employed as one of predictors. A predictor switcher adaptively selects one of prediction information as an optimal prediction signal and selects corresponding differential information as an optimal differential signal. This differential signal is quantized by a quantizer. The quantized output and the optimal prediction signal are summed by an adder and supplied to the predictors as a local decoding signal.

13 Claims, 2 Drawing Sheets

DPCM PREDICTIVE ENCODER

BACKGROUND OF THE INVENTION

1. Field of the invention

The present invention relates generally to a DPCM predictive encoder. More specifically, the invention relates to a DPCM predictive encoder employing a differential PCM system for predictive encoding of a NTSC television image signal.

2. Description of the Related Art

In the predictive encoder for a NTSC color television image signal, a NTSC color television signal is initially converted into a digital signal by an analog/digital converter (A/D converter). A sampling clock frequency of the A/D converter is set at four times of a color sub-carrier frequency, for example. The digital signal is compared with a prediction signal generated in a predictor by an differential value generator so that an differential signal is generated. The differential signal is quantized by a quantizer for encoding. An encoding output is added to the prediction signal of the above-mentioned predictor by an adder so that a local decoding signal is generated. This local decoding signal becomes an input for the predictor to generate the prediction signal.

As a predictor, one frame period predictor constructed with one frame delay circuit, is employed, which generates a pixel information for a subject pixel to be encoded depending upon the corresponding pixel in one previous frame.

Here, it is known in the art that the one frame period predictor is used for obtaining prediction effect, in which an differential signal in a frame period relative to a still image becomes zero. When such one frame period predictor is used in the DPCM predictive encoder employing the A/D converter operating at four times of the sub-carrier frequency, the interframe differential signal in the still image becomes zero to provide effective prediction result. However, if the sampling frequency of the A/D converter is set at three times of the sub-carrier frequency, a sampling phase relationship between the frames is differentiated so that inteframe predictor cannot be effective even on the still image and the differential signal in one frame period cannot be made zero. Therefore, in this case, the interframe prediction is not effective for the still image.

It is an object of the present invention to provide a DPCM predictive encoder which enables interframe prediction to be effective when the A/D converter is acting at the speed three times of the color sub-carrier.

SUMMARY OF THE INVENTION

In order to accomplish above-mentioned and other objects, a DPCM predictive encoding circuit for a NTSC television signal, according to one aspect of the invention, comprises:

predicting means for generating a plurality of predicted frame information for a current frame based on frame information including at least frame information of a frame two frames ahead from the current frame;

differential generator means for generating differential information between respective of the predicted frame information and frame information of the current frame; and means for inputting a sum of optimal one of said differential information and said predicted information to said predicting means, and whereby outputting said differential information as DPCM predictive encoding output.

According to another aspect of the invention, a DPCM predictive encoding circuit, according to the present invention, comprises:

an A/D converter for digitizing a NTSC television signal;

a clock signal generator for generating a sampling clock signal of the A/D converter;

a plurality of predictors predicting a current frame information based on a frame information of a previous frame;

an differential generator generating each differential between each of a plurality of prediction information of a plurality of the predictors and the current frame information;

a selector for selecting a least differential value among the differential values as an differential signal, and selecting a prediction information corresponding to the least differential value as an optimal prediction signal;

a quantizer for quantizing the differential signal;

an adder summing the quantized output and the prediction signal to produce an input for a plurality of the predictors; and one of the predictors including means for generating a pixel information depending upon a corresponding pixel in two frames ahead of a subject pixel to be encoded.

According to a further aspect of the invention, a DPCM predictive encoding circuit comprises:

video information source means for supplying a sequence of frames of video information;

sampling means for sampling said video information for respective frames and supplying frame information in time sequence;

predictor means for predicting a frame information of a current frame on the basis of frame information of a previous frame leading the current frame, said predictor means being operative at mutually distinct plurality of prediction modes for generating a plurality of predicted frame information with respect to said current frame;

differential information generator means generating differential information based on respective of said predicted current frame information and a frame information of the current frame;

selector means for selecting one of said differential information having the least differential value and whereby selectively outputting said predicted frame information at which said least differential value is obtained; and means for outputting said differential information having the least differential value as a DPCM predictive encoder output.

According to still further aspect of the invention, a DPCM predictive encoding circuit comprises:

video information source means for supplying a sequence of frames of video information;

sampling means for sampling said video information for respective frames and supplying frame information in time sequence;

predictor means for predicting frame information of a current frame on the basis of a frame information of previous frames ahead of the current frame, which previous frames at least include a frame two frames ahead of the current frame, said predictor means being operative at mutually distinct plurality of prediction modes for generating a plurality of predicted frame information with respect to said current frame;

differential information generator means generating differential information based on respective of said predicted current frame information and frame information of the current frame;

selector means for selecting one of said differential information having the least differential value and whereby selectively outputting said predicted frame information at which said least differential value is obtained; and means for outputting said differential information having the least differential value as a DPCM predictive encoder output.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but for explanation and understanding only.

In the drawings.

DESCRIPTION OF THE PREFERRED EMBODIMENT

Figure 3:
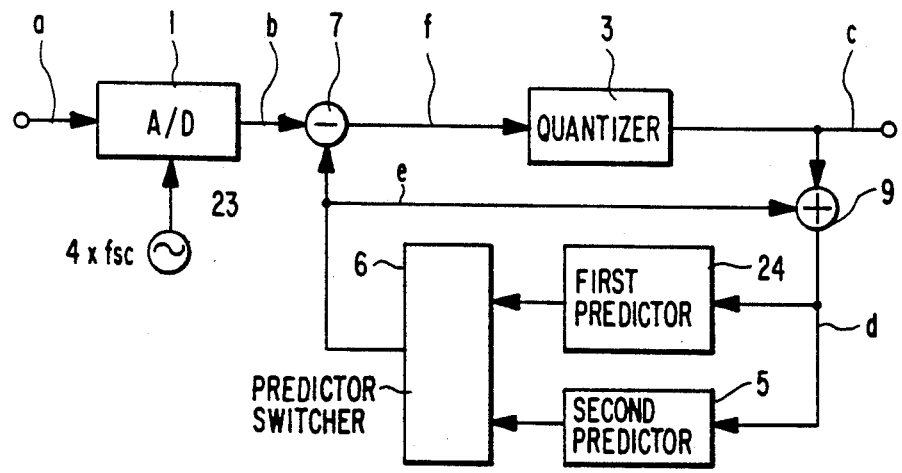
FIG. 3 is a block diagram of the conventional DPCM predictive encoder in the prior art.

In advance to discussion for the preferred embodiment of the invention, brief description for the prior art will be given in order to facilitate better understanding of the invention. FIG. 3 shows a predictive encoder of a NTSC color television image signal. The shown predictive encoder includes an A/D converter 1 for analog-to-digital conversion of the NTSC color television signal a. The sampling clock signal frequency of the A/D converter is four times ($4f_{sc}=4\times 3.58$ MHz$=14.32$ MHz). The clock signal is generated by a clock signal generator 23.

The digital signal produced by the A/D converter 1 is input to a differential signal generator 7 so that a differential signal f with a prediction signal e as another input is obtained in the differential signal generator 7. The differential signal f is quantized by a quantizer 3 for encoding to generate an encoded output c. The encoded output c is also input to an adder 9 as one input. To the other input of the adder 9, the prediction signal e is input. The adder 9 adds the prediction signal e and the differential signal c to generate a local decoded signal d.

This local decoded signal d is input to first and second predictors 24 and 5 so that the prediction signals are generated in both of the first and second predictors 24 and 5. A prediction switcher 6 adaptively selects optimal one of the prediction signal of the predictors. The selected prediction signal e becomes respective one inputs of the differential signal generator 7 and the adder 9. As the adaptive selection method in selection of the prediction signal in the prediction switcher 6, a method for selecting one of the prediction signal at which the differential signal f as the output of the differential signal generator 7 becomes minimum, is employed.

Particularly, as the first predictor 24, it is typical to employ an interframe predictor comprising one frame delay circuit, for example, to generate a pixel information of a subject pixel to be encoded relative to the corresponding pixel in one previous frame. As the second predictor 5, the predictor having construction other than one frame period predictor, such as two-line predictor which performs prediction with respect to the current line and teo previous line, and so forth is employed. Although only the second predictor 5 is illustrated for simplification, third and fourth predictors are additionally employed.

Figure 5:
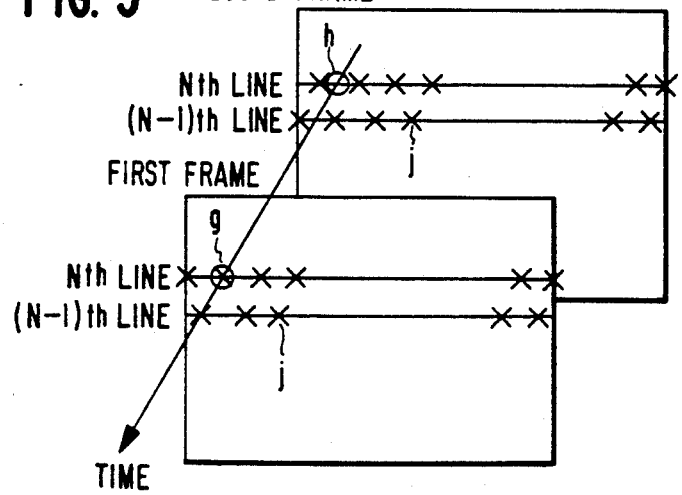
FIG. 5 is an illustrlation showing a phase relationship of sampling pixel when the sampling pixel is sampled at a rate of three times of the color sub-carrier frequency in the conventional predictive encoder.

Here, it is well known that the frame period predictor is used to obtain a prediction effect to make the differential signal between the frames zero with respect to a still image. However, in the conventional DPCM predictive encoder as illustrated in FIG. 3, when the sampling frequency (conversion speed) of the A/D converter 1 is set at three times of the color sub-carrier frequency, a sampling phase relationship between the frames is differentiated as illustrated in FIG. 5 so that the differential signal between the frames will never become zero even for the still image on which the frame period predictor should be effective. Accordingly, it becomes less frequent that the first predictor 24 is selected as the optimal predictor by the predictor switcher 6.

Figure 4:
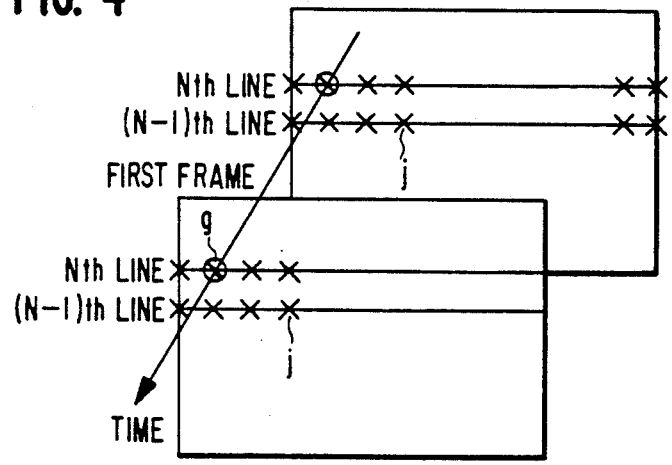
FIG. 4 is an illustration showing a phase relationship of sampling pixel when the sampling pixel is sampled at a rate of four times of the color sub-carrier frequency in the conventional predictive encoder.

FIGS. 4 and 5 illustrates sampling phases of the image signal at every frames when the A/D conversion speeds are set respectively at four times and three times of the color sub-carrier frequency. g represents the subject pixel to be encoded, h represents the corresponding pixel in one previous frame, and j represents each sampling point.

Figure 1:
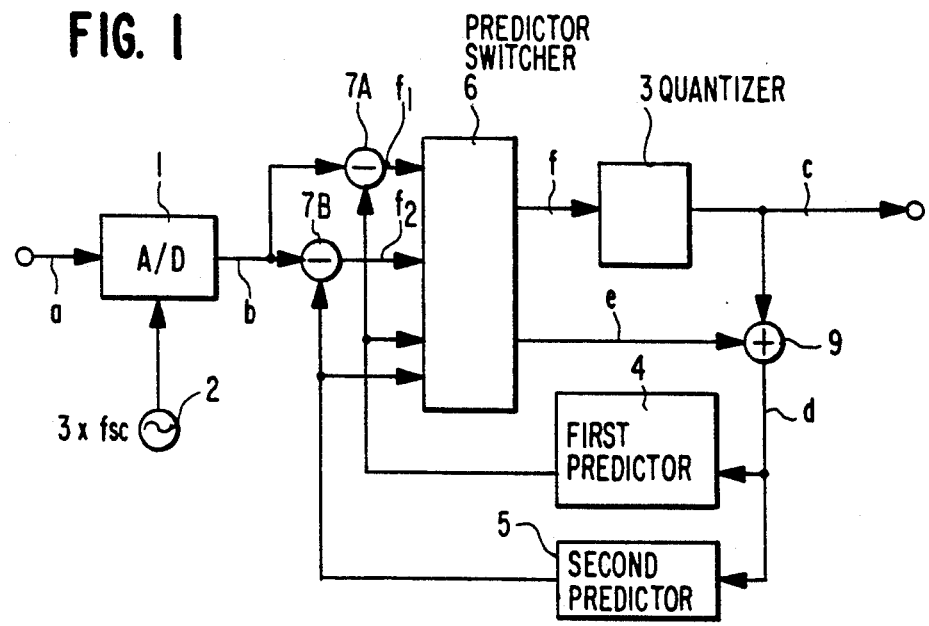
FIG. 1 is a circuit diagram of the preferred embodiment of a DPCM predictive encoder according to the invention.

FIG. 1 is a block diagram of one embodiment of the present invention, in which the common components to those in FIG. 3 are represented by the same reference numerals. The sampling clock signal frequency of the A/D converter 1 for digitizing the NTSC television signal a is assumed to be three times of the color sub-carrier frequency generated by the clock signal generator 2. The digital signal b serves as one input of each of the differential signal generators 7A and 7B. To the other input of each of the differential signal generators, each prediction information of the first and second predictors 4 and 5 is input.

A differential information f1 and f2 of each differential signal generators 7A and 7B is input to the predictor switcher 6 as each input. One of the differential information f1 and f2 is adaptively selected by the switcher 6 and input to the quantizer 3 as a differential signal f. At the same time, the prediction information corresponding to the differential signal f is selected by the switcher 6 and input to one input of the adder 9 as the prediction signal. In the adder 9, the output c of the quantizer, i.e. the differential signal, and the prediction signal e are summed to be input to respective of the predictors 4 and 5 as local decoding signal d. The predictor switcher 6 selects one of the differential signal f1 and f2 having a least value close to zero, and outputs as the differential signal f. Also, the predictor selector 6 outputs the prediction information (output of the predictor) corresponding to the least differential information as the prediction signal e.

In the shown embodiment, the first predictor 4 is a two-frame predictor which performs prediction with respect to the current frame and two previous frame and is formed with a two frame delay circuit which provides a delay for two frames for the image signal. In this case, the capacity of the delay circuit can be expressed as follow:

(Number of Samples in one Scanning line)×(Number Scanning line in one Frame)×(2 Frames)×(Number of Bit per each Sample)=682,5×525×2×(Number of Bit per each Sample)=716625×(Number of Bit per each Sample)

The second predictor 5 can have the same construction as that known in the art. For instance, it can be a two-line period predictor, a sampling period predictor, high level predictor using differential value between a plurality of samples with decoding, and so forth. Also, the second predictor 5 can be a plurality of predictors with combining the above-mentioned predictors.

Figure 2:
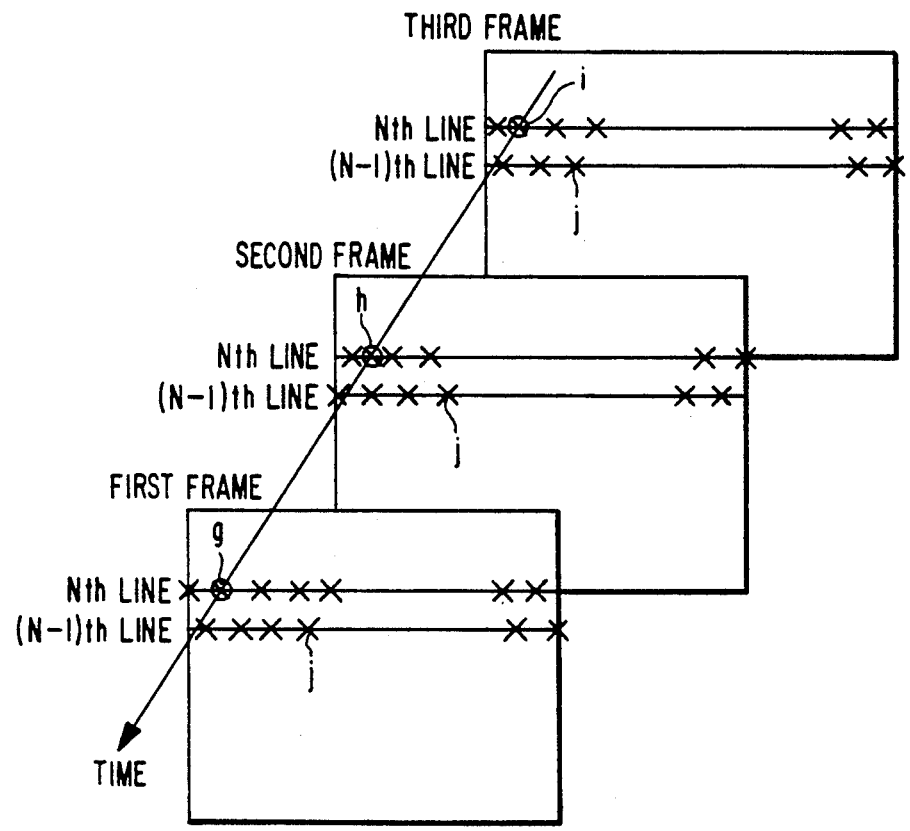
FIG. 2 is an illustration showing a phase relationship between interframe sampling pixel in the preferred embodiment of the invention.

FIG. 2 shows samples phases at respective frames when the first predictor 4 employs the above-mentioned two frame delay circuit to form the two-frame predictor. As can be seen herefrom, the pixel having the same phase to the subject pixel g in one frame (the subject pixel in the current frame) is the corresponding pixel in the two previous frame. It should be noted that, in FIG. 2, h represents a phase point of the pixel in one previous frame, j represents sampling points.

As set forth above, according to the present invention, even when the A/D converter operates at the conversion speed three times of the color sub-carrier frequency, the problem of the sampling phase shift upon input of the still image to make the differential signal upon input of the still image to zero so as to provide excellent prediction effect for the still image and whereby to enhance the picture quality.

What is claimed is:

1. A DPCM predictive encoding circuit for a NTSC television signal comprising:
   predicting means for generating a plurality of predicted frame information for a current frame based on frame information including at least frame information of a frame two frames ahead from the current frame;
   differential generator means for generating differential information between respective of the predicted frame information and frame information of the current frame; and
   means for inputting a sum of optimal one of said differential information and said predicted information to said predicting means, and
   whereby outputting said differential information as DPCM predictive encoding output.

2. A circuit as set forth in claim 1, wherein said two-frame predictor comprises a two-frame delay circuit having a delay period corresponding to two frames.

3. A circuit as set forth in claim 1, wherein said predicting means includes a plurality of predictors for predicting the current frame information based on frame information of a previous frame ahead of the current frame, one of said plurality of predictors being a two-frame predictor predicting the current frame information based on the frame information of said frame two frames ahead of the current frame, and said differential generator means includes a plurality of differential generators corresponding to respective of said plurality of predictors, each adapted to generate a differential information between the predicted information of the corresponding one of said predictors and the frame information of the current frame, and said circuit further comprises means for selecting one of said differential information having the least differential value and outputting one of the predicted information corresponding to the differential information having the least differential value as an optimal predicted information.

4. A circuit as set forth in claim 1, wherein said differential generator means includes a plurality of differential generators corresponding to respective of said plurality of predictors, each adapted to generate a differential information between the predicted information of the corresponding one of said predictors and the frame information of the current frame, and said circuit further comprises means for selecting one of said differential information having the least differential value and outputting one of the predicted information corresponding to the differential information having the least differential value as an optimal predicted information.

5. A circuit as set forth in claim 4, which further comprises A/D converter means for digitizing said NTSC television signal with a sampling clock signal and supplying to said differential generator means as said current frame information.

6. A circuit as set forth in claim 1, which further comprises A/D converter means for digitizing said NTSC television signal with a sampling clock signal and supplying to said differential generator means as said current frame information.

7. A circuit as set forth in claim 6, wherein said sampling clock signal is provided a frequency three times of a color sub-carrier frequency.

8. A circuit as set forth in claim 1, wherein said predicting means includes a plurality of predictors for predicting the current frame information based on frame information of a previous frame ahead of the current frame, one of said plurality of predictors being a two-frame predictor predicting the current frame information based on the frame information of said frame two frames ahead of the current frame.

9. A circuit as set forth in claim 8, wherein said two-frame predictor comprises a two-frame delay circuit having a delay period corresponding to two frames.

10. A circuit as set forth in claim 8, which further comprises A/D converter means for digitzing said NTSC television signal with a sampling clock signal and supplying to said differential generator means as said current frame information.

11. A DPCM predictive encoding circuit comprising:
    A/D converter means for digitizing a NTSC television signal;
    clock signal generator means for generating a sampling clock signal of said A/D converter means;
    a plurality of predictors for predicting current frame information based on frame information of previous frame;
    differential generator means for generating each error between each of a plurality of prediction information of a plurality of said predictors and said current frame information;
    selector means for selecting a least differential value among the differential values as a differential signal, and selecting prediction information corresponding to the least differential value as an optimal prediction signal;

quantizer mans for quantizing said differential signal;

adder means for summing said quantized output and said prediction signal to produce an input for a plurality of said predictors; and one of said predictors including means for generating a pixel information depending upon a corresponding pixel in two frames ahead of a subject pixel to be encoded.

12. A DPCM predictive encoding circuit as set forth in claim 11, wherein said sampling clock signal is set at a frequency three times of the color sub-carrier frequency.

13. A DPCM predictive encoding circuit comprising:

video information source means for supplying a sequence of frames of video information;

sampling means for sampling said video information for respective frames and supplying frame information in time sequence;

predictor means for predicting frame information of a current frame on the basis of a frame information of previous frames ahead of the current frame, which previous frames at least include a frame two frames ahead of the current frame, said predictor means being operative at mutually distinct plurality of prediction modes for generating a plurality of predicted frame information with respect to said current frame;

differential information generator means generating differential information based on respective of said predicted current frame information and frame information of the current frame;

selector means for selecting one of said differential information having the least differential value and whereby selectively outputting said predicted frame information at which said least differential value is obtained; and means for outputting said differential information having the least differential value as a DPCM predictive encoder output.

* * * * *

UNITED STATES PATENT AND TRADEMARK OFFICE
CERTIFICATE OF CORRECTION

PATENT NO. : 5,323,188
DATED : June 21, 1994
INVENTOR(S) : Noboru KAWAYACHI et al.

It is certified that error appears in the above-indentified patent and that said Letters Patent is hereby corrected as shown below:

Col. 5, line 30, after the second occurrence of "pixel", insert --i--.

Signed and Sealed this

Twenty-seventh Day of September, 1994

Attest:

BRUCE LEHMAN

Attesting Officer

Commissioner of Patents and Trademarks